US012432210B2

(12) United States Patent
Appel et al.

(10) Patent No.: US 12,432,210 B2
(45) Date of Patent: Sep. 30, 2025

(54) ENHANCED SECURITY AND EXTENDED FUNCTIONALITY FOR WORKSTATION INTEGRATION WITH MAINFRAME OPERATING SYSTEMS

(71) Applicant: Bank of America Corporation, Charlotte, NC (US)

(72) Inventors: Ryan Appel, Little Elm, TX (US); David Feher, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 377 days.

(21) Appl. No.: 18/094,700

(22) Filed: Jan. 9, 2023

(65) Prior Publication Data
US 2024/0236097 A1 Jul. 11, 2024

(51) Int. Cl.
H04L 9/40 (2022.01)
(52) U.S. Cl.
CPC ........ H04L 63/101 (2013.01); H04L 63/0485 (2013.01)
(58) Field of Classification Search
CPC .. H04L 63/101; H04L 63/0236; H04L 49/253
See application file for complete search history.

(56) References Cited

U.S. PATENT DOCUMENTS

| 4,751,635 A * | 6/1988 | Kret ...................... G06F 16/252 |
| 9,374,324 B2 | 6/2016 | Kuch et al. |
| 9,483,295 B2 | 11/2016 | Gschwind |
| 9,658,973 B2 | 5/2017 | Kreuzenstein et al. |
| 9,772,853 B1 * | 9/2017 | Fields ..................... G06F 9/5055 |
| 10,353,759 B2 | 7/2019 | Belmar et al. |
| 10,489,129 B2 | 11/2019 | Gschwind et al. |
| 10,726,145 B2 * | 7/2020 | Duminy ................ H04L 63/108 |
| 2006/0230405 A1 * | 10/2006 | Fraenkel ................. G06F 9/505 |
| | | 718/104 |
| 2008/0155222 A1 * | 6/2008 | Hasegawa ........... G06F 12/0284 |
| | | 711/E12.013 |
| 2009/0089794 A1 * | 4/2009 | Hilton ................... G06F 9/5033 |
| | | 718/105 |
| 2009/0182979 A1 * | 7/2009 | Farrell ................ G06F 9/45558 |
| | | 718/1 |

(Continued)

OTHER PUBLICATIONS

Wyman et al. "ZAAPs and zIIPs: Increasing the strategic value of System z" [Online], Jan. 2007 [Retrieved on: Mar. 18, 2025], IBM Journal R&D vol. 51, Issue 1.2, Retrieved from: < https://ieeexplore.ieee.org/stamp/stamp.jsp?tp=&arnumber=5388718 > (Year: 2007).*

*Primary Examiner* — Eric W Shepperd
(74) *Attorney, Agent, or Firm* — Banner & Witcoff, Ltd.

(57) ABSTRACT

Improved, secure, encrypted communications between workstations and servers are disclosed along with extended and enhanced functionality for IBM's z/Architecture mainframes. On-demand connections are opened by the mainframe when a command is executed and closed in real-time after the command execution is complete and work results from the workstation are received. Connect-back port instructions and mainframe allow/deny lists for IP addresses provide additional security. Optimized and extended menus and submenus are presented in user interfaces and trigger functions. Binary help files for available commands can be stored on mainframes.

20 Claims, 9 Drawing Sheets

(56) References Cited

U.S. PATENT DOCUMENTS

| | | | |
|---|---|---|---|
| 2011/0154353 A1* | 6/2011 | Theroux | G06F 9/5038 |
| | | | 718/104 |
| 2012/0144157 A1* | 6/2012 | Crew | G06F 9/5044 |
| | | | 712/30 |
| 2013/0031352 A1* | 1/2013 | Driscoll | G06F 9/46 |
| | | | 713/100 |
| 2018/0091380 A1* | 3/2018 | Demkowicz | G06F 9/544 |
| 2018/0239657 A1* | 8/2018 | Petrbok | G06F 9/546 |
| 2021/0352092 A1* | 11/2021 | Deardorff | H04L 63/1425 |

* cited by examiner

Filename
450

WIZE Call
452

FIG. 4B

FIG. 5 (Main Screen)

FIG. 6 (Option "1" - View)

FIG. 7 (Option "2" – File Transfer)

FIG. 8 (Option "3" – FTP using Secured FTP Product)

FIG. 9 (Option "4" – Extract Data from an Excel Workbook)

FIG. 10 (Option "6" – Desktop Tools/Programs:)

FIG. 11 (Option "7" – Launch Predefined URLs)

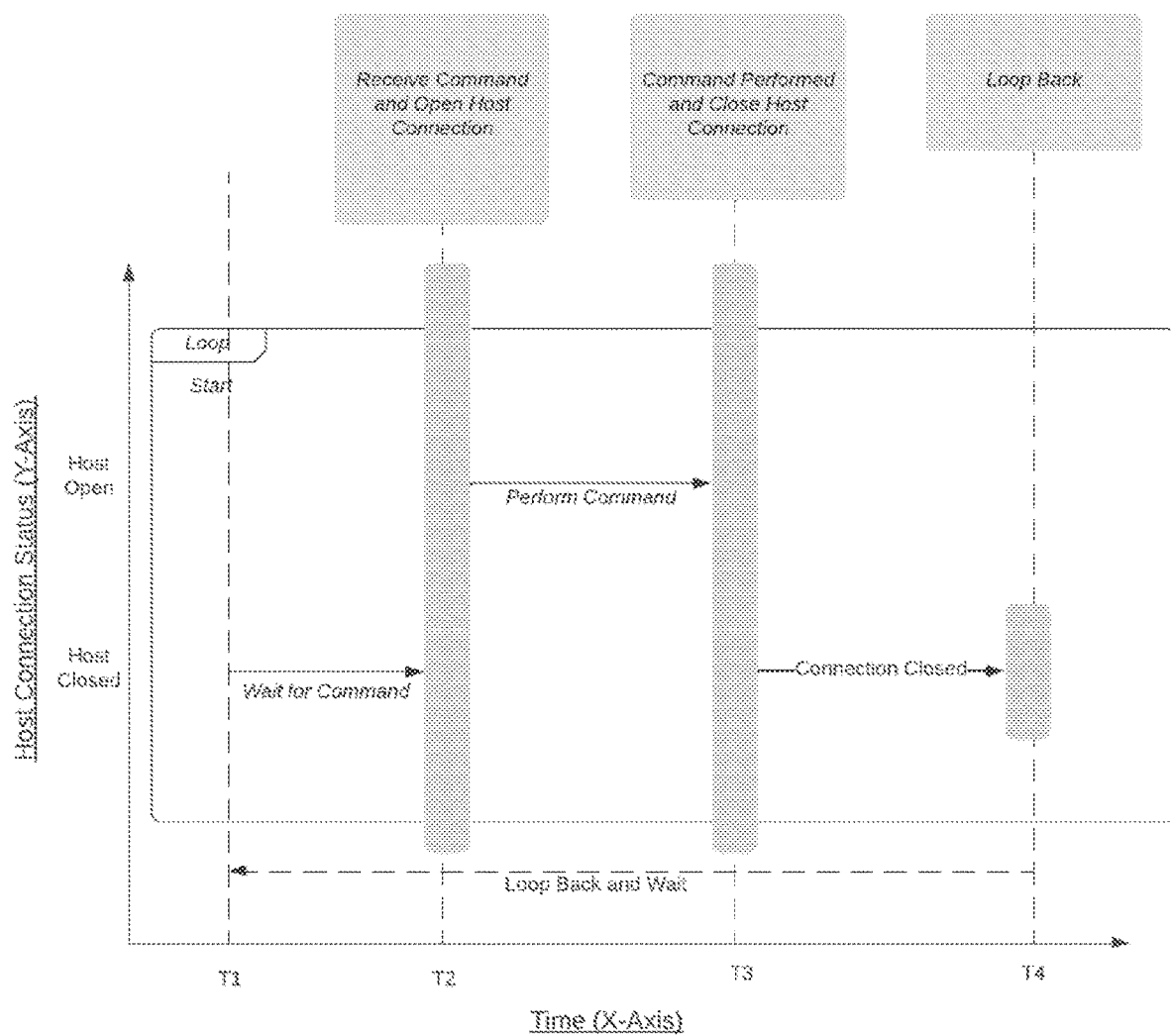
FIG. 12 (Host Connection Open/Close Timing Diagram)

ENHANCED SECURITY AND EXTENDED FUNCTIONALITY FOR WORKSTATION INTEGRATION WITH MAINFRAME OPERATING SYSTEMS

TECHNICAL FIELD OF DISCLOSURE

The present disclosure relates to systems that provide, inter alia, improved processes and machines for securing communications between mainframe Logical PARtition (LPAR), remote workstations/desktops, and shared data based on improved security policies and protocols, on-demand command-duration-time-limited secure connections for encrypted traffic, connect back ports and Internet Protocol (IP) address validation, Windows authentication, mainframe Resource Access Control Facility (RACF) authentication, and shared resource security, as well as for minimizing mainframe bandwidth consumption by utilizing System z Application Assist Processor (zAAP) processors to offload work from mainframe general processors.

BACKGROUND

IBM mainframes running the IBM z/OS operating system (e.g., version 2.4 and before), in conjunction with IBM's Workstation Agent (WSA) programs on remote terminals, has been used in the prior art for years. The mainframes have been secured with Resource Access Control Facility (RACF) authentication, and shared data coupled to the workstations have been secured by Organizational Unit (OU) security. However, the overall traffic between mainframe Logical PARtition(s) (LPARs) and computers/workstation/terminal emulators in such prior art systems has not been secure.

IBM's WSA is a small desktop client and is an integral part of z/OS. It is provided within the Interactive System Productivity Facility (ISPF) panel interface to the Time Sharing Option (TSO) on mainframe sessions. WSA is distributed as a binary along with z/OS ISPF. ISPF is a full panel application and application Application Program Interface (API) navigated by keyboard. ISPF includes a text editor and dataset browser, and functions for locating and listing files and performing other utility functions.

After logging on to TSO, users typically access the ISPF menu. In fact, many use ISPF exclusively for performing work on z/OS. ISPF menus list the functions that are most frequently needed by online users.

The WSA permits communication between two IP addresses: the local desktop running the WSA and a mainframe LPAR. Each computer running WSA and each LPAR will have their own unique IP address pairs. The WSA essentially functions as a bridge between the two.

LPARs are, in practice, equivalent to separate mainframes. Each LPAR runs its own operating system. This can be any mainframe operating system such as z/OS or the like.

The WSA supports operating system connections (e.g., Unix, etc.) and requires a one-time configuration to establish mainframe IP addresses.

The WSA can initiate desktop-based commands and launch desktop applications constructed on the mainframe. It is provided with a limited set of ISPF functions as part of the IBM dialog manager that are driven by application program interfaces (APIs) to invoke various functions. This functionality was only available when the WSA was running on the workstation. These functions are now gone based on deprecation of the prior operating system, because with z/OS 2.5, WSA is no longer supported and all functionality and ISPF APIs for WSA have been disabled.

3270 terminals are non-programmable (sometimes called "dumb") workstations. Stated more simply, it is a display screen with a keyboard attached. The 3270 terminal only had rudimentary communication capabilities and was text-based. One of the earliest model 3270 terminal displays (3278 model 1) consisted of 12 rows and 40 columns of text characters, no more and no less. Eventually, a 24×80 screen size became the standard, with some alternate sizes available.

Current sessions between the workstation and the mainframe LPAR still interact in the form of text interfaces that only provided 24 lines by 80 columns of displayed characters. As such, due to screen-capacity constraints, "help" panels displayed therein were insufficient to show detailed documentation, which typically would explain every detail and function of company-created tools available on the LPAR.

Prior art FIG. 1 illustrates the foregoing at a high level. Client computers run local copies of terminal emulators 104A/106A and workstation agents (WSA) 104B/106B and connect to an IBM mainframe 100 running z/OS version 2.4 or prior. WSAs 104B/106B exchange "unencrypted" traffic 102 with the mainframe 100. Computers 104/106 communicate with one another, as well as with Windows security-controlled shared drives 110/112/114 containing shared data, via standard communication protocols and hardware 108.

Unfortunately, communications between IBM mainframe consumers via WSA are "not" secure in z/OS Version (v.2.4.) (and prior versions) because, as noted above, traffic between WSA desktops/terminal emulators and mainframes is "unencrypted." On the mainframe side, Resource Access Control Facility (RACF) was used to protect what data a user could access from the mainframe perspective. And on the WSA client side, organizational unit (OU) security protected what could be accessed by the user on the desktop, shared drive, other network accessible storage, etc. But again, the transmissions between the client and the server were unencrypted and therefore unprotected. As such, IBM deprecated both the WSA executables and the ISPF APIs and WSA functionality with the release of z/OS 2.5 claiming that products such as the IBM Developer for z/OS (IDz) would function as a viable replacement for the functionality that WSA provided. However, simply installing IBM's next version of z/OS (i.e., version 2.5) and using IBM's desktop interface/editor with the mainframe (IDz) is not a viable replacement for many customers because there is no migration path that would preserve previously implemented mainframe tools and further because the new version of z/OS results in a loss of ISPF programming functionality.

Other problems involve the fact that prior WSA functionality was very limited. z/OS version 2.4 (and prior iterations) simply provided a pipeline with very limited functions. As an example, enterprises typically use common desktop applications such as Excel and utilize it as their database for storing data and executing macros to extract/manipulate data from forms, etc. Version 2.4 of z/OS had no ability to execute local applications such as Excel, Word, etc. Instead, workstation commands (WSCMD) were limited to command (CMD) prompts. File transfer commands (FILEXFER) provided unencrypted file transfers and there was no knowledge of specific file types or translation between the Extended Binary Coded Decimal Interchange Code (EBCDIC) (i.e., an eight-bit character encoding used primarily on IBM mainframe and IBM midrange computer operating systems) and workstation desktop codes (i.e., American Standard Code for Information Interchange (ASCII)). Further, although WSA allowed the ability to edit and view workstation files (through the EDIT/VIEW ISPF APIs), the ability to edit and view mainframe files on the workstation was limited such that only one editor could be used. This limited, for example, how a user could edit a text-based file (that resides on the mainframe LPAR) such as a program source code versus how a user could edit a Word document (which also resides on the mainframe LPAR). If only one editor could be chosen, there would be no way to efficiently edit both text-based files and binary-based files such as Word documents or Excel documents. Additionally, in order to perform viewing of data within Excel files (that exist on the user's desktop), three disparate processes had to be executed as part of a customized wrapper process while the WSA was running: (a) connect to the WSA client to send a macro-enabled workbook to the desktop, which would enable extraction of data from any Excel workbook on the workstation, (b) send another command down to run the macro-enabled workbook with the path of the Excel file from which data was to be extracted, and (c) execute a command to transfer the extracted data back to mainframe. WSA also required forced, persistent, workstation connections and disconnections through the WSCON/WSDISCON API functions.

Based on the foregoing and as further detailed herein, there is a long felt and unsatisfied need in the field of mainframe computing to provide, inter alia, improved end-to-end secure communications between LPARs, workstations, and the like; to extend the mainframe tools capable of being utilized on the workstations despite removal of previously available tools and utilities in deprecated operating systems; and to circumvent the mainframe display limitations when trying to view help or other documentation for complex tools and utilities.

SUMMARY

In accordance with one or more arrangements of the disclosures contained herein, solution(s) are provided to address one or more of the shortcomings in the mainframe and workstation industry by implementing a Workstation Integrations for z Systems Enhanced (WIZE) invention that replaces the WSA product that IBM removed in z/OS 2.5. This disclosure keeps the ability to run commands on the desktop that could be constructed on the mainframe. Additional functionality above and beyond what WSA could provide has been provided herein. Further, the WIZE system provides the ability to easily convert previously used workflows without any need to abandon those workflows in z/OS 2.5. WIZE is also easier to use, provides easier extension, and is easier to maintain. As such, it is a substantial improvement over and overcomes the limitations of the prior art.

WIZE achieves this, for example, by: (a) providing improved secure connection flows between mainframes and workstations based on the highest level encryption mutually supported by both the mainframe and the workstation (e.g., selection of Advanced Encryption Standard with a 256-bit key (AES-256)) encryption in Transport Layer Security (TLS) 1.2 protocol or later is preferable); (b) implementing on-demand command-duration-time-limited (or similar connection-open time constraints) for secure connections for encrypted traffic; (c) utilizing connect-back ports and IP address validation to further improve security; (d) providing extended custom tools and utilities that can be cooperatively triggered and executed by mainframes and workstations through WIZE API(s); (e) implementing a one-step process for retrieving data from a mainframe, triggering client components to load local desktop applications to interact with data, and returning data results to the mainframe (as opposed to the traditional three step process of the prior art); (f) storing binary versions of companion documents on mainframe to provide help on tools and allow users to locally load and launch the binary help documents (e.g., Word documents that are 10 to 25+ page comprehensive explanations of how customers can use these custom built tools) as in graphical user interfaces (GUIs) instead of mainframe screens of "24 lines by 80 columns" of displayed characters; (g) utilizing C# (.NET Framework) programming on the client to provide tight integration with Windows, to be able to use modern techniques in order to increase the capabilities of the client, and to enable transition to a .NET core if client execution is required for machines running Mac OSX or Linux, in addition to Windows; (h) using Java (preferably at least V. 1.8 or later) for one portion of the server component to work with zAAP (System z Application Assist Processors, which are special processors designed to execute Java programs and offload work from the general processors) in order to reduce the number of millions of instructions per second (MIPS) executed on the mainframe (which is typically rented by IBM and for which IBM charges by the MIPS), to enable a substantial amount of work and bandwidth to be offloaded from the mainframe general processors, to use standard encryption techniques for communication as the security providers are integrated into z/OS and can be extended as more encryption standards are developed without the need to change the current code; and (i) using the REXX Programming Language (Restructured Extended Executor—which can run as interpreted or compiled code) as the other mainframe server component to enable integration of error messages and return codes more closely in-line with ISPF (e.g., the REXX mainframe component itself handles displaying error messages when the desktop client is not started on the workstation and a command is attempted to be issued).

Enhanced connection flows, connection diagrams, and tool functionality (accessible by API(s)) are detailed herein for reference. Additional examples and configuration variations will be readily understood by persons of ordinary skill in the art.

Preferably, all WIZE connections start from the mainframe and connect to the desktop client. Other than an File Transfer Protocol (FTP) window on the desktop client (as detailed infra), there is no connection that is preferably initiated from the desktop. Although this is preferable in the preferred embodiments of this disclosure, it is not mandatory, and this disclosure covers all connections irrespective of whether starting at the server or starting at the desktop client.

Preferably, all connections are maintained until the desktop client closes the connection or there is some type of error in which the mainframe process that is holding the connection open is closed or until WIZE itself is closed. But this is preferable and is not mandatory.

For security purposes, there is no permanent open connection between the WIZE client and the mainframe. The connection preferably only stays active as needed to request/initiate the command, process the command, and transmit/return the results of the command.

At a high level, one implementation of an enhanced system allows a user to be authenticated via traditional Windows authentication on a desktop and to then open a mainframe 3270 emulator in which to interact with the mainframe. The workstation can request a host connection from the mainframe. Using the new tooling (with WIZE APIs), the mainframe can initiate the connection and instruct the workstation to connect back to the mainframe on a specific port. Once the mainframe connection is allowed, the workstation can connect back to the mainframe on the identified port. The mainframe can then validate the IP address and the connection port. The applicable command can then be sent from the mainframe to the workstation. The appropriate tool or command can then be executed on the workstation, which can then access shared data or the like as it is executing under the privilege of the user on the desktop system. Once the work is completed, the workstation can return the data to the mainframe, and the connection can be closed. Preferably, the host connection is only opened on demand and only stays open during the duration of the command and its associated processing; it is then closed to provide enhanced security.

Another high-level example is allowing a user to log into a TSO through a client on the workstation. A connection is initiated to the enhanced client through the enhanced server component. The client is instructed to connect back to the mainframe on a specific port after validating that the mainframe is on an "allow" list for connections. The client connects back to the mainframe on the specified port. The mainframe component validates that the connected client is the one that is supposed to be connecting back. A secure connection is then established with the mainframe (LPAR, etc.) as the server. The mainframe component transmits the command to be executed to the workstation. The workstation client component then executes the command and returns the appropriate output. The connection is closed between the mainframe component and the workstation desktop component immediately thereafter.

Examples of tools and utilities available as commands to be sent/received between the mainframe and the workstation desktop and executed (through one or more application program interface(s) (APIs) include: WZCMD (an interface allowing any program to be run with any parameters); GET/PUT (file transfers with encryption, and with automatic and overridable transfer and encoding support, i.e. text files automatically transfer with encoding changes between ASCII (and commonly use 8-bit Unicode Transformation Format (UTF-8) encoding) and EBCDIC (commonly use IBM-1047 encoding)); WSEDIT/WSVIEW (ability to edit and view workstation files within the 3270 emulator); secure connections that are established and maintained only for the duration of the command itself; EXCEL (allows automatic extraction of data from Excel documents and workbooks, with the data automatically being returned to the mainframe without additional transfer commands); OPEN (opens files and Uniform Resource Locator (URL) in the default handler configured by Windows); VIEW/EDIT (ability to edit mainframe files with a specific editor designated to be used with specific file extensions such as opening COBOL files with Notepad++, Word documents with Microsoft Word, Excel documents with Microsoft Excel, etc.); REG (query the Windows registry and get values); ENVIRONMENT (get environment variables and default browser configurations); SPECIALFOLDER (get the values of special folders); OSVERSION (get the version of Windows that is being executed on the workstation); and READ/WRITE (text files to/from a stem in REXX, which is similar to an array or a dictionary object in Java or the like language.).

As a preliminary matter, in the context of this disclosure, various similar terms are used such as encryption, hashing, and salting. Although similar and often used in conjunction with one another, they serve different functions and operate differently.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, an on-demand host-connection process between a mainframe and workstation can comprise one or more steps of: (a) executing, on the workstation, a client application; (b) executing, on the mainframe, a server component in a logical partition, the server component including a Java application running in a Java Virtual Machine (JVM) that is executed on zAAP processors and a general application (e.g., REXX-interpreted, REXX-compiled, etc.) that is executed by general processors on in a central processing complex, the mainframe protected by Resource Access Control Facility (RACF) security; (c) authenticating, by the workstation, a Time Sharing Option (TSO) session; (d) transmitting, by the server component to the client application, a connect-back port instruction identifying a port on which communications should take place and an IP address for the LPAR; (e) receiving, by the client application, the connect-back port instruction, the port, and the IP address; (f) validating, by the client application, that the IP address is on an allowed list for mainframe connections; (g) connecting, by the client application responsive to the connect-back port instruction, the workstation to the mainframe on the port at the IP address of the LPAR; (h) validating, by the server component, the client application on the port; (i) opening, by the server component, a secure host connection between the mainframe and the workstation (e.g., at an open time); (j) transmitting, by the server component to the client application, a command to be executed; (k) receiving, by the client application from the server component, the command to be executed; (l) executing, by the client application, the command; (m) transmitting, from the client application to the server component, output generated in response to execution of the command; (n) closing, by the server component, the secure connection after the output is received at a close time.

In some arrangements, communications between the workstation and the mainframe are further secured by encryption using a highest level of a Transport Layer Security (TLS) protocol (preferably version 1.2 or later) that is mutually supported by both the workstation and the mainframe. As an example, TLS 1.2 offers AES-256 encryption and supposing both the workstation and mainframe support TLS 1.2, AES-256 would be the most secure encryption algorithm available, and as such, the one chosen to secure communications.

In some arrangements, functions required by commands to be performed are executed on the zAAP processors whenever possible to minimize processing bandwidth required of the general processors in the mainframe's central processing complex.

In some arrangements, the secure connection is immediately closed after the output is received. In other arrangements, the secure connection is only open for a limited time interval that spans from no more than the open time to the close time.

In some arrangements, WIZE commands can include one or more of: GET, PUT, EXCEL, OPEN, VIEW, EDIT, WSVIEW, WSEDIT, READ, REG, ENVIRONMENT, SPECIALFOLDER, OSVERSION, READ, and WRITE. These are sample commands that the mainframe can transmit to the client computer for execution.

In some arrangements, a one-step process is used to retrieve data from the LPAR.

In some arrangements, the server component may store binary help files that provide documentation and explanation for available commands and tools. The server component can receive from the client application a request the binary help files. The files can be transmitted from the mainframe to the workstation and then displayed in a word processor or other viewer on the workstation.

In some arrangements, WIZE enables a mainframe application to provide a main user interface and/or application program interface (API) to interact with the new tooling having a main menu comprising: (a) a primary view option to view or launch a Personal Computer (PC) file; (b) a file-transfer option to transfer the PC file between the workstation and the mainframe; (c) a file-transfer-protocol (FTP) option to transfer the PC file between the workstation and the mainframe using an File Transfer Protocol Secure (FTPS) protocol; (d) an extract Excel option to extract Excel data; € a general launch option to open a desktop application; and (f) a URL option to launch web sites in order to prevent loss of access. Various submenus may be triggered by one or more of the foregoing as depicted in the figures and perform the functionality referenced therein. The foregoing function as APIs that can be called within REXX tooling to enable workstation commands/file transfers to be issued. As such, they are examples of workflows that can be built around WIZE functionality.

In some arrangements, the secure connection is immediately closed after output is received by the mainframe from the workstation after performing the selected command.

In some arrangements, one or more process steps are executed in real-time.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise. A skilled artisan will readily appreciate that the entirety of this disclosure is extremely broad and is not in any way limited to the examples or arrangements expressly recited herein.

BRIEF DESCRIPTION OF THE DRAWINGS

FIG. 4B is a screenshot of a sample 3270 terminal depicting a portion of a file that calls a WIZE command as a sample of one or more aspects in which this WIZE disclosure can be implemented.

FIG. 5 is a sample user interface for a top-level "main screen" corresponding to exemplary and extensible functionality and tools, which can be displayed on client instances of one or more aspects of this WIZE disclosure and can be utilized with corresponding WIZE server components on mainframes.

FIG. 6 is a sample user interface for a "view" submenu that can be displayed on client instances of one or more aspects of this WIZE disclosure and can be utilized with corresponding WIZE server components on mainframes.

FIG. 7 is a sample user interface for a "file transfer" submenu that can be displayed on client instances of one or more aspects of this WIZE disclosure and can be utilized with corresponding WIZE server components on mainframes.

FIG. 8 is a sample user interface for a "FTP" submenu that can be displayed on client instances of one or more aspects of this WIZE disclosure and can be utilized with corresponding WIZE server components on mainframes.

FIG. 9 is a sample user interface for a "extract data" submenu that can be displayed on client instances of one or more aspects of this WIZE disclosure and can be utilized with corresponding WIZE server components on mainframes.

FIG. 10 is a sample user interface for a "desktop tools/programs" submenu that can be displayed on client instances of one or more aspects of this WIZE disclosure and can be utilized with corresponding WIZE server components on mainframes.

FIG. 11 is a sample user interface for a "launch predefined URLs" submenu that can be displayed on client instances of one or more aspects of this WIZE disclosure and can be utilized with corresponding WIZE server components on mainframes.

FIG. 12 is an exemplary timing diagram for opening a host connection when a command is received and closing the question after command execution is complete to provide further enhanced security in accordance with one or more aspects of this WIZE disclosure.

DETAILED DESCRIPTION OF THE DISCLOSURE

Figure 1:
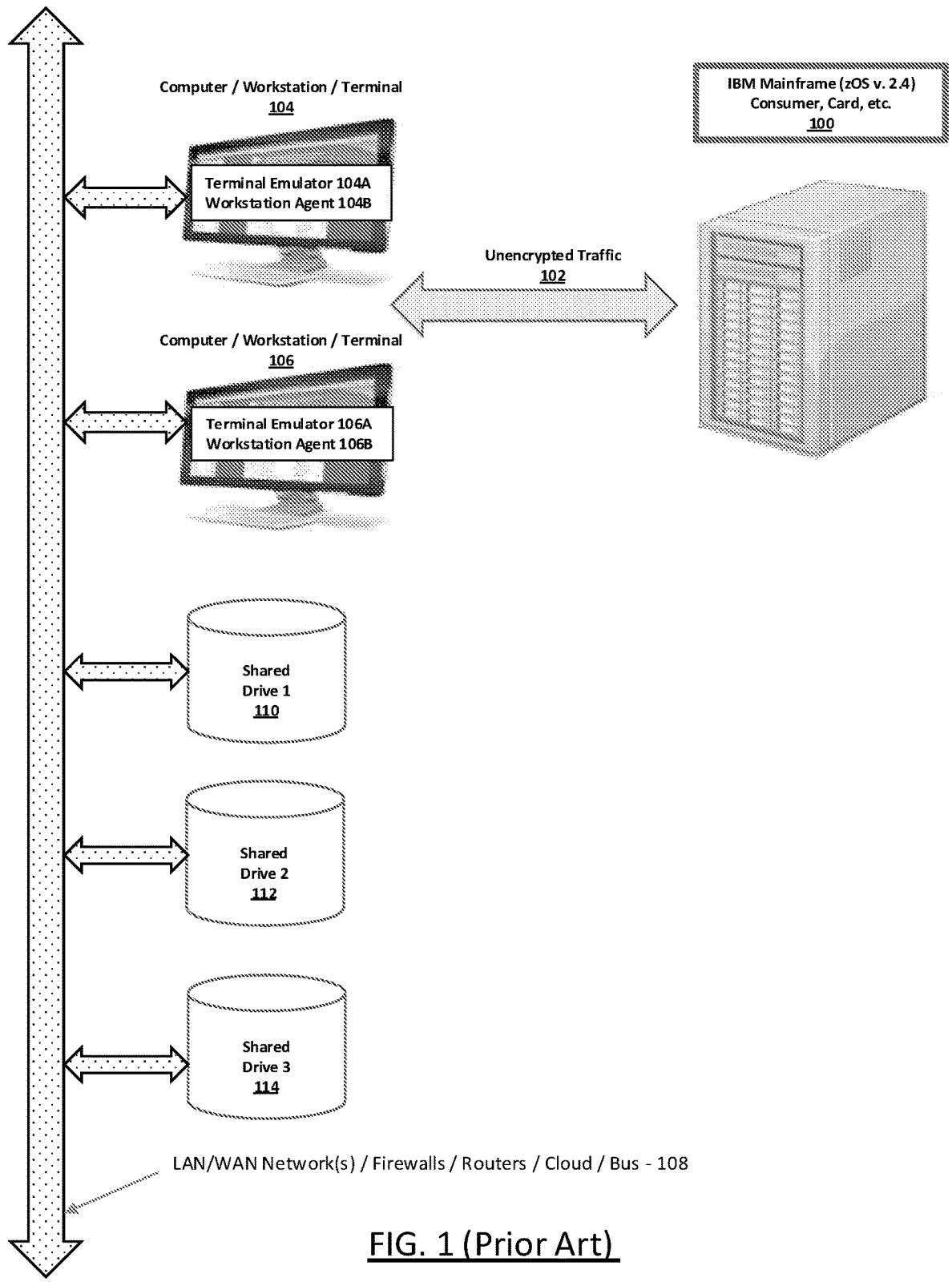
FIG. 1 illustrates a prior art implementation of an IBM mainframe, running z/OS version 2.4 or prior, that is used in conjunction with workstations and desktop accessible storage shares.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in this description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, clients, clusters, compliance watchers, computing devices, computing platforms, controlled computers, controlled computers, controlling computers, desktop computers, distributed systems, enterprise computers, instances, logical partitions, laptop devices, mainframes, monitors or monitoring systems, nodes, notebook computers, personal computers, portable electronic devices, servers, smart devices, streaming servers, tablets, and/or workstations, which may have one or more Application-Specific Integrated Circuit (ASIC), microprocessors, cores, executors, LPARs, etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), component(s), or the like. Instead, references in this disclosure to computers, machines, or the like are to be interpreted broadly as understood by skilled artisans. Further, as used in this specification, computers, mainframes, machines, or the like also include all hardware and components typically contained therein such as, for example, ASICs, processors, executors, cores etc., display(s) and/or input interfaces/devices, network interfaces, communication buses, or the like, and memories or the like, which can include various sectors, locations, partitions, structures, or other electrical elements or components. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alerts, applications, application program interfaces (APIs), artificial intelligence, attachments, big data, binary files, cryptography, cryptographic hashes, daemons, databases, datasets, drivers, data structures, emails, encryptions, file systems or distributed file systems, firmware, governance rules, graphical user interfaces, hashes, images, instructions, machine learning, middleware, modules, objects, operating systems, platforms, processes, protocols, programs, routines, scripts, tools, utilities, etc.

The software, computer-executable instructions, data, modules, processes, routines, or the like can be on tangible computer-readable memory (local, in network-attached storage, on logical partitions, be directly and/or indirectly accessible by bus, network, removable media, remote, cloud-based, cloud-accessible, partition, etc.), can be stored in volatile or non-volatile memory, and can operate autonomously, on-demand, on a schedule, spontaneously, proactively, and/or reactively, and can be stored together or distributed across computers, machines, or the like including memory and other components thereof.

The software, computer-executable instructions, data, modules, processes, routines, or the like, when executed—individually and/or collectively across—one or more various computers, machines, or the like (or any components therein) may cause ASICs, processor(s), core(s), executor (s), etc. to perform functions relevant to mainframe, workstation, and/or the like processing in one or more aspects of this disclosure.

As used throughout this disclosure, computer "networks," topologies, or the like (e.g., 108, etc.) can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), Bluetooth, ultra-wideband (UWB), various protocol(s), or any direct or indirect combinations of the same. Networks also include associated equipment and components such as access points, adapters, buses, Bluetooth adapters, ethernet adaptors (physical and wireless), firewalls, hubs, modems, routers, and/or switches UWB adapters, located inside the network, on its periphery, and/or elsewhere, and software, computer-executable instructions, data, modules, processes, routines, or the like executing on the foregoing. Network(s) may utilize any transport that supports HTTP or any other type of suitable communication, transmission, and/or other packet-based or other suitable protocol.

Figure 2:
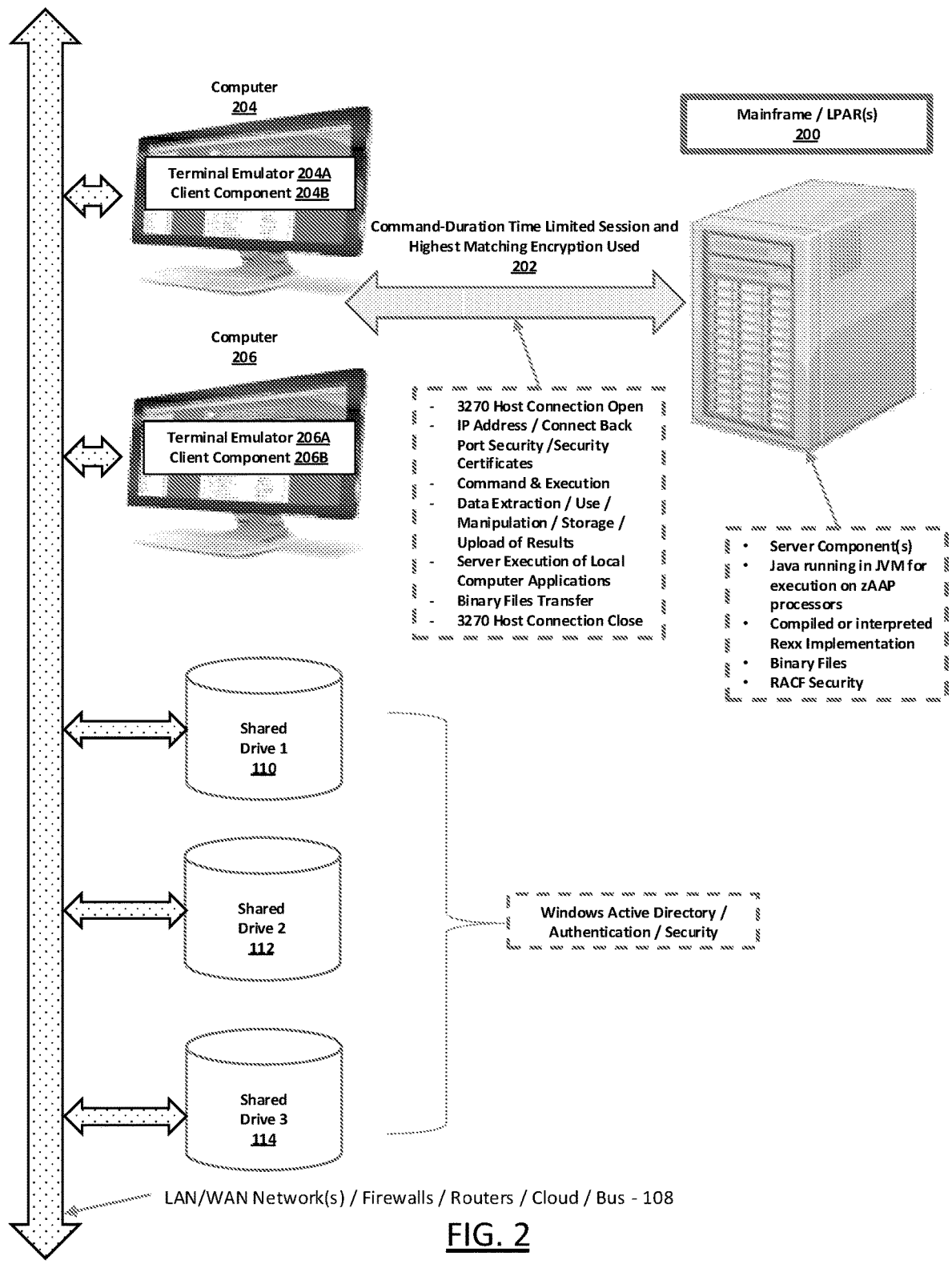
FIG. 2 is a sample high-level overview and operating environment in which one or more aspects of this WIZE disclosure can be implemented.

FIG. 2 is a sample high-level overview and operating environment in which one or more aspects of this WIZE disclosure can be implemented. A mainframe 200, potentially with one or more LPAR(s) functioning as their own server(s), can include server component(s) that provide the enhanced server functionality and tools of this WIZE disclosure and can be secured by mainframe RACF authentication. It may also contain binary files such as, for example, for comprehensive documentation and help information for users to understand the available tools and their functionality that can be called as APIs with REXX tooling to enable WIZE workstation commands, file transfers, etc.

WIZE preferably utilizes binary files since they are more effective than text storage. The ability to handle Word documents, Excel spreadsheets, comma separated value (CSV) files, etc. in binary is one of WIZE's advantages. Memory usage is typically lower when storing values in numeric formats, such as Institute of Electrical and Electronics Engineers (IEEE) 754, as opposed to text characters. Additionally, binary formats have benefits in terms of access speed, and binary file navigation is quicker and more versatile. In contrast, when working with text files, it is typically necessary to read the entire file to locate a certain value. For the foregoing reasons, comprehensive documentation and help information for users to understand the available tools, their functionality, etc. is preferably stored as binary files in WIZE.

WIZE-related traffic 202, exchanged between the mainframe 200 running one or more server components and computers 204/206 running terminal emulators and the enhanced client components of this disclosure, can be secured with AES-256 encryption (or the highest security protocol that is mutually available for both the client and mainframe). Preferably, individual host connections, between the clients 204/206 and mainframe/LPAR(s) 200, are opened on-demand upon execution of a command, are only maintained as "open" while executing the command and are thereafter "closed." This provides enhanced security protections and minimizes the load on the mainframe/LPARs. The exchanged traffic may further include IP address/connect-back port security and security certificates. Commands and execution thereof, as well as data extraction/use of data/manipulation of data/storage processes for storing or updating data/uploading of processing results, etc., are exchanged too. WIZE server execution commands to trigger local client computer applications and to transfer binary files from the mainframe/LPARs 200 to the computers 204/206 are exchanged as well.

Computers 204, 206 respectively execute a terminal emulator 204A/206A and client component 204B, 206B to interface with mainframe 200. Computers 204, 206 are also communicatively coupled via 108 to shared drives 110, 112, 114. Data may be extracted therefrom and utilized in conjunction with one or more tools or functionality of the enhanced server component on the mainframe/LPARs. Access to shares 110, 112, 114 can be controlled by Windows Active Directory or similar authentication and security.

Client components 204B, 206B are preferably written in C# programming on the client to provide tight integration with Windows. This also enables modern techniques to be used to increase the capabilities of the application and to enable transition to a .NET core if client execution is required for machines running Mac OSX or Linux, in addition to Windows.

One aspect of the server component on the mainframe 200 is preferably written in Java to work with zAAP processors (IBM System z Application Assist Processor). zAAPs operate asynchronously with the general-purpose processors to execute Java programming under control of an IBM Java Virtual Machine (JVM). This helps reduce the demands and capacity requirements on general purpose processors, which may then be available for reallocation to other System z workloads. Further, since IBM rents its mainframes and charges based on the number of millions of instructions per second (MIPS) that are required, offloading the JVM processing to the zAAP processors minimizes costs and infrastructure complexity. The use of Java also enables standard encryption techniques for communication to be used as the security providers are integrated into z/OS and can be extended as more encryption standards are developed without the need to change the current code.

The other aspect of the server component is preferably written in REXX (the Restructured Extended Executor programming language) for which a mainframe compiler is available. The REXX application operates on the central processor complex (CPC) of the general-purpose processors. This enables integration of error messages and return codes more closely in-line with ISPF (e.g., the REXX mainframe component itself handles displaying error messages when the desktop client is not started on the workstation and a command is attempted to be issued).

Figure 3:
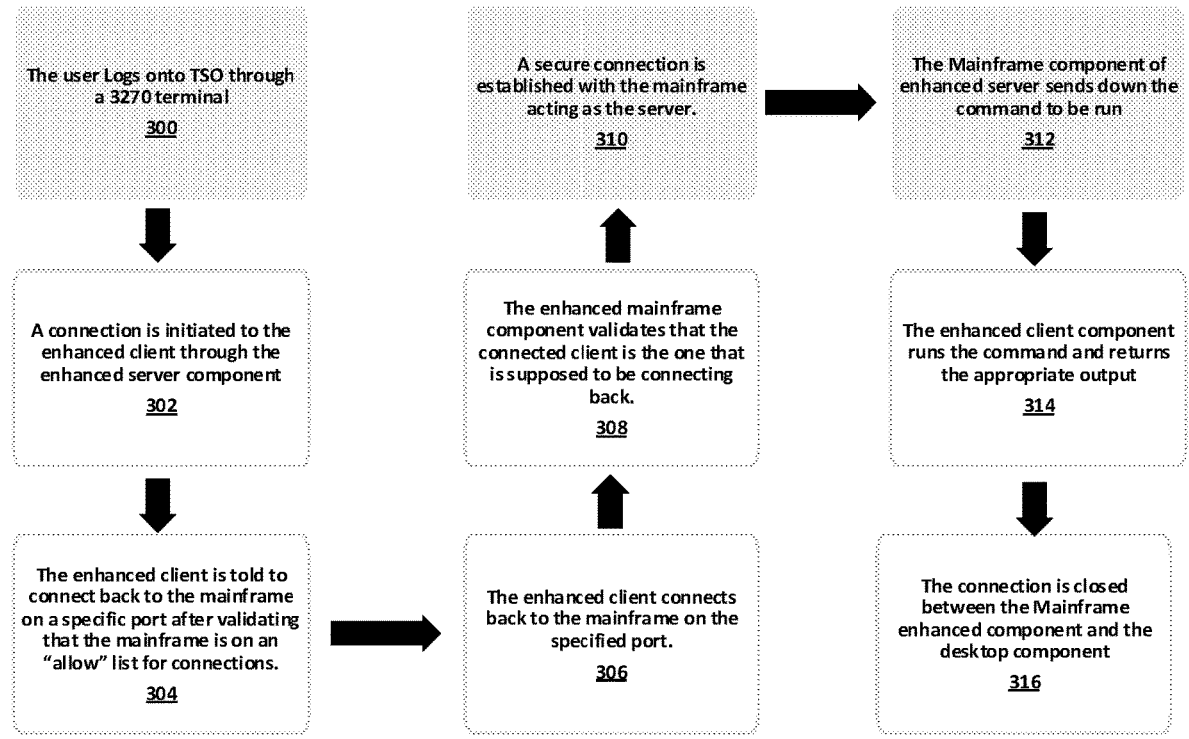
FIG. 3 is a sample high-level flow diagram illustrating how to implement one or more aspects of this WIZE disclosure.

By way of non-limited reference and explanation, FIG. 3 is a sample high-level flow diagram illustrating how to implement one or more aspects of this WIZE disclosure.

A user can log onto a mainframe via the Time Sharing Option (TSO) of z/OS through a 3270 terminal or emulator in 300. A connection is initiated to the enhanced client through the enhanced server component in 302. The enhanced client is instructed to connect to the mainframe on a specific port after validating that the mainframe is on an "allow" list for connections in 304.

The enhanced client connects back to the mainframe on the specified port in 306. The enhanced mainframe component validates that the connected client is the one that is supposed to be connecting back in 308. A secure connection is established with the mainframe acting as the server in 310.

The mainframe component of the enhanced server transmits the command to be executed in 312. The enhanced client component runs the command and returns the appropriate output in 314. The connection is then closed between the mainframe enhanced-server component and the desktop component in 316.

Figure 4A:
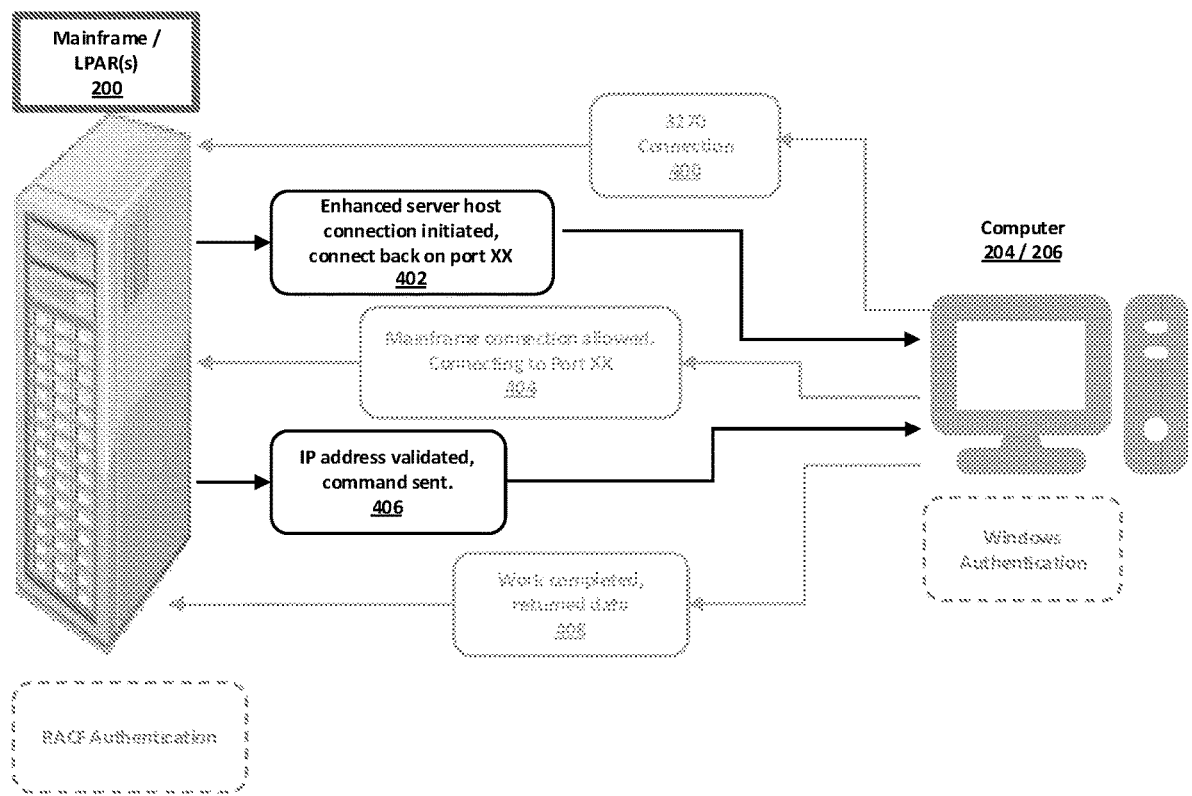
FIG. 4A is a sample high-level flow diagram illustrating encrypted traffic communications, security, and various functionality that in which one or more aspects of this WIZE disclosure can be implemented.

By way of non-limited reference and explanation, FIG. 4A is a sample high-level flow diagram illustrating encrypted traffic communications, security, and various functionality that in which one or more aspects of this WIZE disclosure can be implemented.

A user can access computers 204, 206 and the enhanced client component 204B/206B by one or more types of Windows authentication or the like. A host connection is opened in 400. After the enhanced server host connection is initiated, the mainframe instructs enhanced client component 204A, 206A to connect back to it on a specific port number (i.e., "Port XX" in FIG. 4) in 402. The mainframe connection is then allowed and the client connects to the mainframe on the specified port in 404. The mainframe validates the IP address and transmits a command to the computer 204, 206 that is to be executed by client component 204B, 206B in 406. The command is executed by the client component 204B, 206B. The work is completed and then the resulting data is returned in step 408. The mainframe may also provide security in the form of RACF authentication.

There are various WIZE commands that the mainframe can transmit for execution on the client computer. Sample commands can include GET, PUT, EXCEL, OPEN, VIEW, EDIT, WSVIEW, WSEDIT, READ, REG, ENVIRONMENT, SPECIALFOLDER, OSVERSION, READ, and WRITE.

Figure 4B:
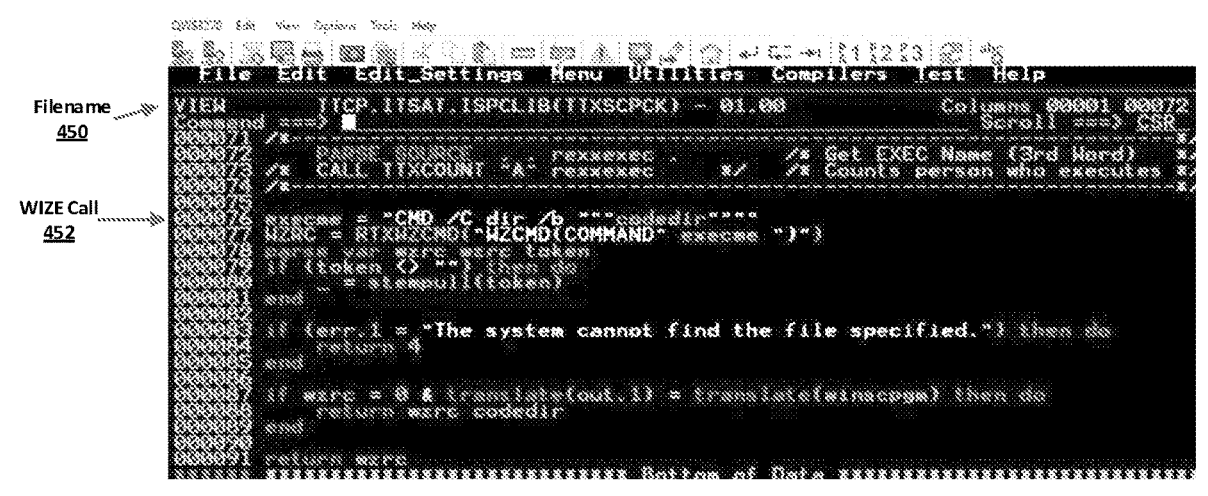

By way of non-limited reference and explanation, FIG. 4B is a screenshot of a sample 3270 terminal depicting a portion of a file that calls a WIZE command as a sample of one or more aspects in which this WIZE disclosure can be implemented. In this example, the file containing the code to make the WIZE call is identified at the top of the terminal as TTCP.ITSAT.ISPCLIB(TTXSCPCK), which is filename 450.

In the body of the file, lines 76-77 demonstrate how the WIZE commands can be called (452) and information can be passed like an API. This is because functions can be called from within it.

In this example, the mainframe instructs the client to execute a command on the desktop and then return the data back into the system on the mainframe. The remainder of the file after line 77 is error checking and returning the value as a result of the function.

By way of non-limited reference and explanation, FIG. 5 is a sample user interface for a top-level "main screen" corresponding to exemplary and extensible functionality and tools, which may be invoked by WIZE (like API functionality) and can be displayed on client instances of one or more aspects of this WIZE disclosure and can be utilized with corresponding WIZE server components on mainframes.

Sample tools and functionality, which may be invoked by WIZE (similar to API functionality), may include (1) a view option for viewing/launching local desktop files, (2) initiating a file transfer between the PC and the mainframe, (3) initiating a secure FTP transfer between the PC and the mainframe, (4) an extract Excel option for extracting data from Excel files, (5) build tab file to generate a tab-delimited file, (6) a general launch option to launch PC utilities and programs, and (7) a web "use it or lose it" (UIOLI) tool to launch web sites to prevent loss of access due to elapsed time constraints.

By way of non-limited reference and explanation, FIG. 6 is a sample user interface for a "view" submenu that can be displayed on client instances of one or more aspects of this WIZE disclosure and can be utilized with corresponding WIZE server components on mainframes. This can provide a list of directories, subdirectories, and files. Search commands can be performed. Historical listings of recently use files can be displayed. Users can launch files, edit files, view files, and delete files.

By way of non-limited reference and explanation, FIG. 7 is a sample user interface for a "file transfer" submenu that can be displayed on client instances of one or more aspects of this WIZE disclosure and can be utilized with corresponding WIZE server components on mainframes. This can be a PC transfer tool that allows transferring of files from the mainframe to the PC or from the PC to the mainframe. A mainframe Data Set Name (DSN) can be entered. Similarly, a PC directory, PC filename, and file type transfer designation of ASCII or binary may be entered.

By way of non-limited reference and explanation, FIG. 8 is a sample user interface for a "FTP" submenu that can be displayed on client instances of one or more aspects of this WIZE disclosure and can be utilized with corresponding WIZE server components on mainframes. This is a secure FTP tool like what is depicted in FIG. 7 and further includes security information such as an RACF password.

By way of non-limited reference and explanation, FIG. 9 is a sample user interface for a "extract data" submenu that can be displayed on client instances of one or more aspects of this WIZE disclosure and can be utilized with corresponding WIZE server components on mainframes. This tool can extract data from an Excel workbook, or the like.

Figures 10, 11:
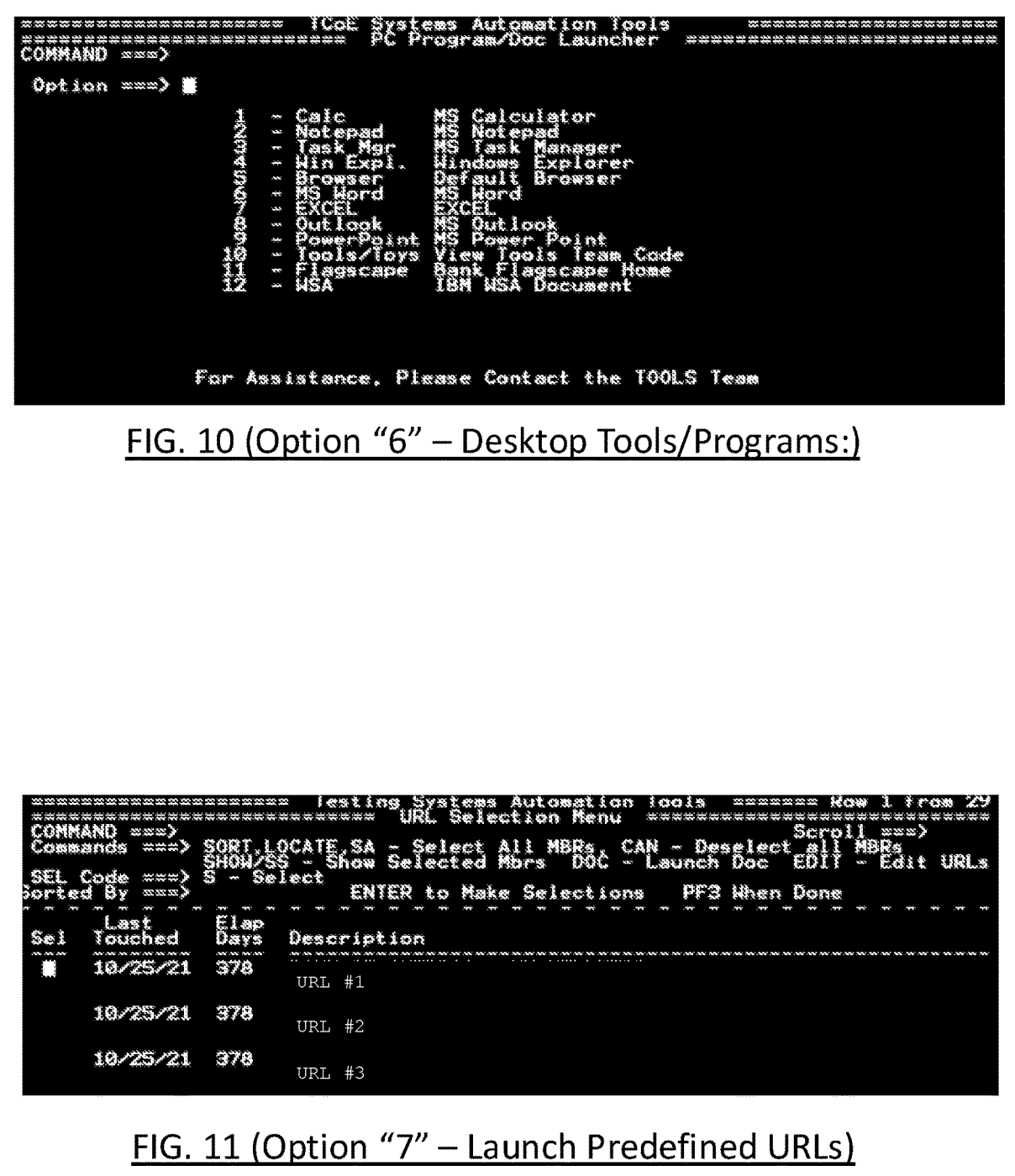

By way of non-limited reference and explanation, FIG. 10 is a sample user interface for a "desktop tools/programs" submenu that can be displayed on client instances of one or more aspects of this WIZE disclosure and can be utilized with corresponding WIZE server components on mainframes. This is the PC program/document launcher, which provides options to trigger execution of local documents and programs. They include: the Microsoft Calculator, Microsoft Notepad, Microsoft Task Manager, Windows Explorer, a web browser, Microsoft Word, Microsoft Excel, Microsoft Outlook, Microsoft PowerPoint, etc.

By way of non-limited reference and explanation, FIG. 11 is a sample user interface for a "launch predefined URLs" submenu that can be displayed on client instances of one or more aspects of this WIZE disclosure and can be utilized with corresponding WIZE server components on mainframes. This is a URL selection menu that identifies the date that the address was last visited, the number of elapsed days since the last visit, as well as the URL name, description, and/or IP address.

By way of non-limited reference and explanation, FIG. 12 is an exemplary timing diagram for opening a host connection when a command is received and closing the question after command execution is complete to provide further enhanced security in accordance with one or more aspects of this WIZE disclosure. The Y-axis of the diagram shows the connection status and varies from "host closed" (low value) to "host open" (high value). The X-axis of the diagram shows various dynamic time intervals for waiting for commands, processing commands, and opening/closing host connections.

At T1, the enhanced client/server security process commences. The host connection is initially closed at T1. The process waits for a command to be received. When a command is received at T2, the host connection is opened. The host connection remains open while the command and associated processing is performed. Once the command and processing is complete, the connection is closed at T3. The process then loops back from T4 to T1 to wait for the next command to be received. The host connection remains closed, for security purposes, until the next command is received. When the next command is received, the process can be repeated.

In one aspect of WIZE, there could be four main components to a WIZE server/client architecture. The first of these components is a WIZE REXX executable that lives within the Mulitple Virtual Storage (MVS) portion of the z/OS operating system. This could reside within a Partitioned Date Set (PDS) and the PDS could be allocated on the SYSEXEC or SYSPROC File Concatenation. The second of these components is a WIZE REXX executable that lives within Unix System Services (USS) alongside the java Jar that will be mentioned below. This REXX executable could have permissions set so that any user can execute it, but so that it assumes the credentials of the owning user and the owning group so that the java jar file, configuration, and java key store (JKS) can all be protected from general read and write except for authorized users. This will be described in more detail below. The third of these components is a java jar file which contains the connection code that will allow a connection to the user's desktop for the initial connection as well as the rest of the connection flow for a secure connection. The final of these components is the desktop client which contains the user GUI, configuration options, and the user code that will listen for an initiated connection from the mainframe and then connect back using a secure connection protocol such as a Transmission Control Protocol (TCP) connection wrapped in a TLS 1.2 or better wrapper.

This aspect of WIZE could contain a MVS REXX exec within a PDS/E allocated on the SYSPROC so it can be utilized as an API that can be called from other REXX execs. The user could be able to call this REXX exec from a valid ISPF session over an online TSO interface. This will allow the mainframe to supply ZIPADDR which is an IBM populated ZVAR that can be obtained within the REXX exec itself without the user having to supply it. Because the user has already authenticated to the mainframe and the ZIPADDR variable is auto populated with the client connection IP address, this will provide a way to get the information and ensure that a client is not trying to maliciously connect to a different machine. The main purpose of this REXX exec is threefold: provide a standard interface that a user may call WIZE while utilizing powerful REXX parsing in order to parse through passed options and validate the options, obtain the ZIPADDR variable value to pass to the WIZE Java Jar executable so it will know the client to perform the initial connection to, and return information from a call to BPXWDYN (which is the IBM supplied method that this REXX executable should use to call the WIZE USS executable) as a stem that is accessible to calling programs. Additionally, this MVS REXX exec can utilize z/OS Messages to be displayed by an ISPF screen for the calling user if (for example) their WIZE client is not started on their desktop.

This aspect of WIZE could contain an USS REXX executable that resides inside the same folder structure as the WIZE jar executable. This USS REXX executable should perform the following functions: it should be able to read a configuration file and parse options passed to it from the WIZE MVS REXX executable as described above to pass this information further along to the WIZE java jar to perform the connection. This could be accomplished in the following manner: the REXX executable should be able to be read and executed by all users, but when executed the REXX executable should have the process that is spawned take the User ID and the Group ID of the owner and group owner of the file. This is applied in Unix terminology as a sticky bit on both the User and the Group of the file. The executable should have the permission bits of -rwsrwsr-x. The Rexx executable should then parse the passed in options from the MVS Rexx exec, read the configuration data from the configuration file (which will be described below) and pass these values into the java jar as either command line parameters or as java options set with the -D switch as described in the JVM documentation or manual. A brief description of the -D switch for java can be understood by passing—help to the java command.

This aspect of WIZE could contain a configuration file that resides in the USS file system along with the WIZE REXX exec and the WIZE jar. This file could contain a configuration option for the following three items at a minimum: "-Djavax.net.ssl.keyStore", "-Djavax.net.ssl.keyStorePassword", and "-Djavax.net.ssl.keyStoreType". These three options are the minimum requirement for utilizing TLS within Java as a server component. Java utilizes a KeyStore to store certificates and requires a password and the keyStoreType in order to access the keystore and the certificates within. This file should be protected from modification from any user and should be limited to modification by allowing only the owning user, and/or owning group to modify the contents. This can be further augmented with setfacl if necessary, as described in the manual for setfacl.

This embodiment of WIZE could also contain a java jar executable within USS on the mainframe. This java component will receive all configuration data passed in options either with the -D switch or as command line parameters and will utilize the information to start an ad-hoc server utilizing a randomly generated TLS secured TCP port. It will also use this information to make an initial connection to a client and to alert the client to the port on which to connect. It will finally utilize this information to perform the action specified by the caller of the WIZE REXX interface using any of the available API calls. JavaScript Object Notation (JSON) objects could be utilized for transmission of both the data sent to the client after the connection is secured, and for the data returned to the java jar in order to ensure that data can be passed to the WIZE MVS Exec through simple printline commands that BPXWDYN can automatically separate per line and per stream. For example, if a command is run on the desktop, and has separate error output and normal output, the JSON data can clearly separate these, and the java jar can also print the normal output to System.out and the error output to System.err so that BPXWDYN can return those lines of output in two separate stems to the WIZE MVS component. This Jar should also handle all translation of data between EBCDIC (IBM-1047) and ASCII (UTF-8). This should be utilized with every connection to a desktop with the following six objects: A java.io. InputStream and java.io.OutputStream to perform binary communication (such as transferring binary files), a java.io.InputStreamReader and a java.io.OutputStreamWriter set with a charset of StandardCharsets.UTF_8 that will perform the automatic translation between the native mainframe EBCDIC codec and the native Windows (and other general purpose OS) codec of ASCII, a java.io.BufferedReader and java.io.BufferedWriter to enable the ability to write character strings or JSON serialized data directly to a stream built from the java.io.InputStreamReader and java.io.OutputStreamWriter to enable automatic translation between codecs. See the example below in which the variables being assigned are private variables owned by the WIZE server object within the java code.

1. socket=(SSLSocket) this.serverSocket.accept( );
2. . . . (code here for validating remote socket and starting TLS handshake)
3. outputStream=socket.getOutputStream( );
4. inputStream=socket.getInputStream( );
5. outputStreamWriter=new OutputStreamWriter(outputStream, StandardCharsets.UTF_8);
6. inputStreamReader=new InputStreamReader(inputStream, StandardCharsets.UTF_8);
7. bufferedWriter=new BufferedWriter(outputStreamWriter);
8. bufferedReader=new BufferedReader(inputStreamReader);
9. . . . (code here for performing data movement functions such as sending JSON objects back and forth between the client and the server).

Finally, this aspect of WIZE could contain a user client that resides on the desktop that integrates with the underlying OS. We recommend C# (.NET CORE) as it is cross platform and can build cross platform GUI's and perform TLS connections as a server and a client. If there is no plan to deploy WIZE on any other platforms than windows, we recommend C# (.NET Framework) as it offers tighter integration with Windows. This client could utilize JSON to send data back and forth between itself and the java jar that resides on the mainframe for communication. This structure will ensure that information can be clearly understood and separated.

This provides on-demand command-duration-time-limited secure connections for encrypted traffic in accordance with one or more aspects of this disclosure.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An on-demand host-connection process between a mainframe and workstation comprising the steps of:
 (a) executing, on the workstation, a client application;
 (b) executing, on the mainframe, a server component in a logical partition (LPAR), with the server component including a Java application running in a Java Virtual Machine (JVM) executed on System z Application Assist Processors (zAAP) and a general application executed by general processors in a central processing complex, said mainframe protected by Resource Access Control Facility (RACF) security;
 (c) authenticating, by the workstation, a Time Sharing Option (TSO) session;
 (d) transmitting, by the server component to the client application, a connect-back port instruction identifying a Transmission Control Protocol/Internet Protocol (TCP/IP) port on which secure communications should take place and an Internet Protocol (IP) address for the LPAR;

(e) receiving, by the client application, the connect-back port instruction, the port, and the IP address;

(f) validating, by the client application, that the IP address is in a permitted list for mainframe connections;

(g) connecting, by the client application responsive to the connect-back port instruction, the workstation to the mainframe on the port at the IP address of the LPAR;

(h) validating, by the server component, the client application on the port;

(i) opening, by the server component, a secure connection between the mainframe and the workstation at an open time;

(j) transmitting, by the server component to the client application, a command to be executed;

(k) receiving, by the client application from the server component, the command to be executed;

(l) executing, by the client application, the command;

(m) transmitting, from the client application to the server component, output generated in response to execution of the command; and (n) closing, by the server component, the secure connection after generation and transmission of the output at a close time.

2. The on-demand host-connection process of claim 1 wherein the secure communications between the workstation and the mainframe are further secured by encryption using a highest level of a Transport Layer Security (TLS) protocol version 1.2 or 1.3 mutually supported by both the workstation and the mainframe.

3. The on-demand host-connection process of claim 2 in which functions required by the command are performed on the zAAP processors to minimize processing bandwidth required of the general processors in the central processing complex.

4. The on-demand host-connection process of claim 3 in which the secure connection is immediately closed after the output is received.

5. The on-demand host-connection process of claim 3 wherein the secure connection is only open for a limited time interval that spans from no more than the open time to the close time.

6. The on-demand host-connection process of claim 5 in which the encryption of the TLS protocol version 1.2 or 1.3 is Advanced Encryption Standard with a 256-bit key (AES-256) encryption.

7. The on-demand host-connection process of claim 6 in which the general application is a Restructured Extended Executor (REXX)-compiled application.

8. The on-demand host-connection process of claim 6 in which the general application is a REXX-interpreted application.

9. The on-demand host-connection process of claim 7 in which the command is selected from the group consisting of: GET, PUT, EXCEL, OPEN, VIEW, EDIT, WSVIEW, WSEDIT, READ, REG, ENVIRONMENT, SPECIALFOLDER, OSVERSION, READ, and WRITE.

10. The on-demand host-connection process of claim 9 in which a one-step process is used to retrieve data from the LPAR.

11. The on-demand host-connection process of claim 10 in which the steps are executed in real-time.

12. The on-demand host-connection process of claim 11 further comprising:

(o) storing, by the server component, a binary help file for the command;

(p) receiving, by the server component from the client application, a request for the binary help file;

(q) transmitting, by the server component to the client application, the binary help file;

(r) launching, by the workstation, a word processor; and (s) displaying, by the client application in the word processor, help information contained in the binary help file.

13. An on-demand host-connection process between a mainframe and workstation comprising the steps of:

(a) executing, on the workstation, a client application;

(b) executing, on the mainframe, a server component in a logical partition (LPAR);

(c) authenticating, by the workstation, a session;

(d) transmitting, by the server component to the client application for the session, a connect-back port instruction identifying a port on which communications should take place and an IP address for the logical partition;

(e) receiving, by the client application, the connect-back port instruction, the port, and the IP address;

(f) validating, by the client application, that the IP address is in a permitted list for mainframe connections;

(g) connecting, by the client application responsive to the connect-back port instruction, the workstation to the mainframe on the port at the IP address of the LPAR;

(h) validating, by the server component, the client application on the port;

(i) if the IP address is validated as being in the permitted list for mainframe connectionsvalidated:

opening, by the server component, a secure connection between the mainframe and the workstation;

transmitting, by the server component to the client application, a command to be executed;

receiving, by the client application from the server component, the command to be executed;

executing, by the client application, the command;

transmitting, from the client application to the server component, output generated in response to execution of the command;

storing, by the server component, the output generated; and closing, by the server component, the secure connection after the output is received, (j) if the IP address is not validated as being in the permitted list for mainframe connections:

rejecting, by the server component, the secure connection;

wherein the communications between the workstation and the mainframe are encrypted and the secure connection is only open during a time period from processing of the command until transmission of the output.

14. The on-demand host-connection process of claim 13 in which the encryption is an algorithm provided by TLS 1.2 or 1.3 and the mainframe is protected by remote access control facility (RACF) security.

15. The on-demand host-connection process of claim 14 in which a one-step process is used to retrieve data from the LPAR.

16. The on-demand host-connection process of claim 15 further comprising:

(j) storing, by the server component, a binary help file for the command;

(k) receiving, by the server component from the client application, a request for the binary help file;

(l) transmitting, by the server component to the client application, the binary help file;
(m) launching, by the workstation, a word processor; and
(n) displaying, by the client application in the word processor, help information contained in the binary help file.

17. The on-demand host-connection process of claim 16 in which Java-enabled functions required by the command are performed in a Java Virtual Machine (JVM) on the mainframe to minimize processing requirements of general processors in the mainframe.

18. A real-time on-demand host-connection process between a mainframe and workstation comprising the steps of:
   (a) executing, on the workstation, a client application;
   (b) executing, on the mainframe, a server component in a logical partition (LPAR), the server component including a Java application running in a Java Virtual Machine (JVM) executed on zAAP processors and a REXX-interpreted application executed by general processors in a central processing complex, said mainframe protected by Resource Access Control Facility (RACF) security;
   (c) authenticating, by the workstation, a Time Sharing Option (TSO) session;
   (d) transmitting, by the server component to the client application, a connect-back port instruction identifying a port on which communications should take place and an IP address for the logical partition;
   (e) receiving, by the client application, the connect-back port instruction, the port, and the IP address;
   (f) validating, by the client application, that the IP address is on an allowed list for mainframe connections;
   (g) connecting, by the client application responsive to the connect-back port instruction, the workstation to the mainframe on the port at the IP address of the LPAR;
   (h) validating, by the server component, the client application on the port;
   (i) if the IP address is validated as being in the permitted list for mainframe connections:
      opening, by the server component, a secure connection between the mainframe and the workstation;
      providing, by the client application, a main user interface having a main menu and submenus for a view user interface to view or launch Personal Computer (PC) files, a file-transfer user interface to transfer the PC files between the workstation and the mainframe, File Transfer Protocol (FTP) user interface to transfer the PC files between the workstation and the mainframe via an FTP protocol, an extract data user interface to procure spreadsheet data, a web user interface to prevent loss of web site access due to time expiration, and a desktop tools user interface to enable the server component to instruct the workstation component to open local applications;
      transmitting, by the server component to the client application, a command to be executed;
      receiving, by the client application from the server component, the command to be executed;
      executing, by the client application, the command;
      transmitting, from the client application to the server component, output generated in response to execution of the command;
      storing, by the server component, the generated output;
      closing, by the server component, the secure connection immediately after the output is received,
   (j) if the IP address is not validated as being in the permitted list for mainframe connections: rejecting, by the server component, the secure connection;
   wherein the communications between the workstation and the mainframe are secured using AES-256 encryption and the secure connection is only open during processing of the command until transmission of the output.

19. The real-time on-demand host-connection process of claim 18 in which Java-enabled functions required by the command are performed in the Java Virtual Machine on the mainframe to minimize processing requirements of the general processors in the mainframe.

20. The real-time on-demand host-connection process of claim 19 further comprising:
   (k) storing, by the server component, a binary help file for the command;
   (l) receiving, by the server component from the client application, a request for the binary help file;
   (m) transmitting, by the server component to the client application, the binary help file;
   (n) launching, by the workstation, a word processor; and
   (o) displaying, by the client application in the word processor, help information contained in the binary help file.

* * * * *